H. G. RUCKER & W. P. DAMBAUGH.
WATER HEATER.
APPLICATION FILED JUNE 15, 1912.
1,070,846.
Patented Aug. 19, 1913.
2 SHEETS—SHEET 1.
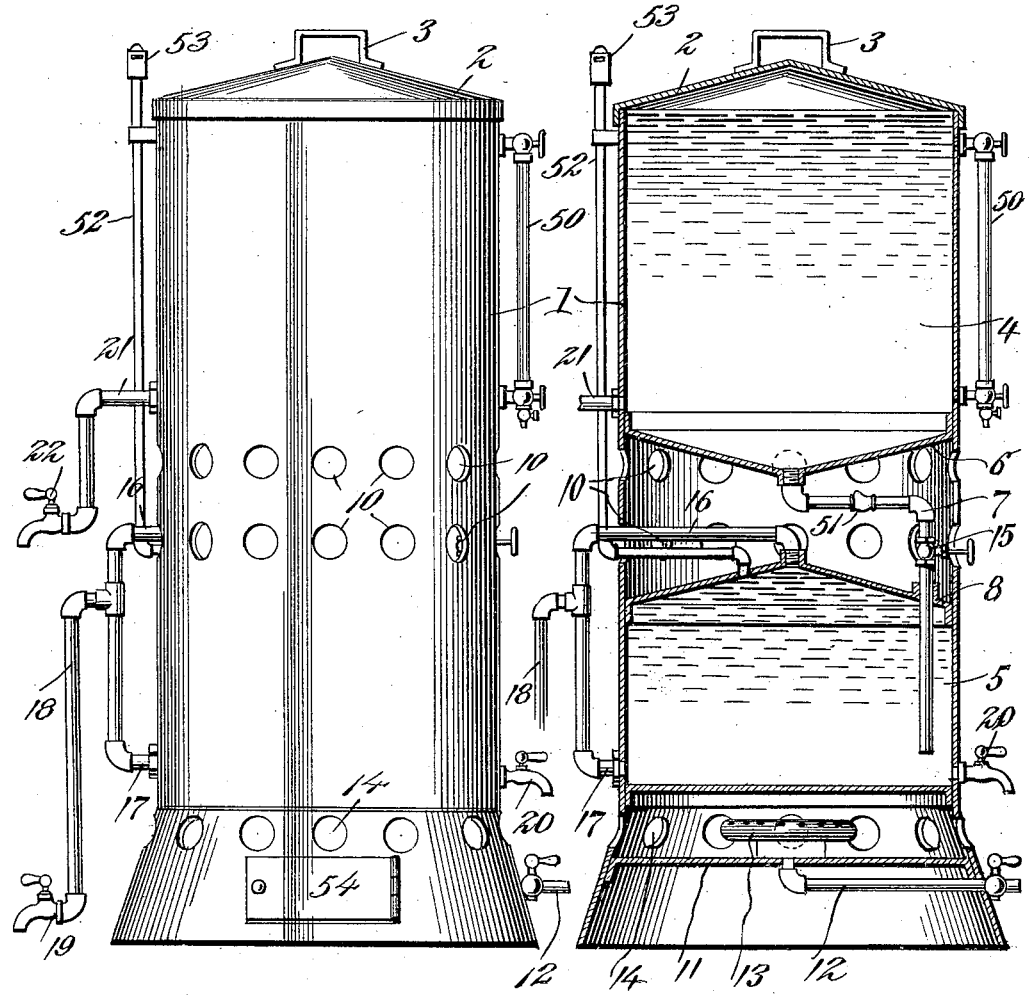

H. G. RUCKER & W. P. DAMBAUGH.
WATER HEATER.
APPLICATION FILED JUNE 15, 1912.
1,070,846.
Patented Aug. 19, 1913.
2 SHEETS—SHEET 2.
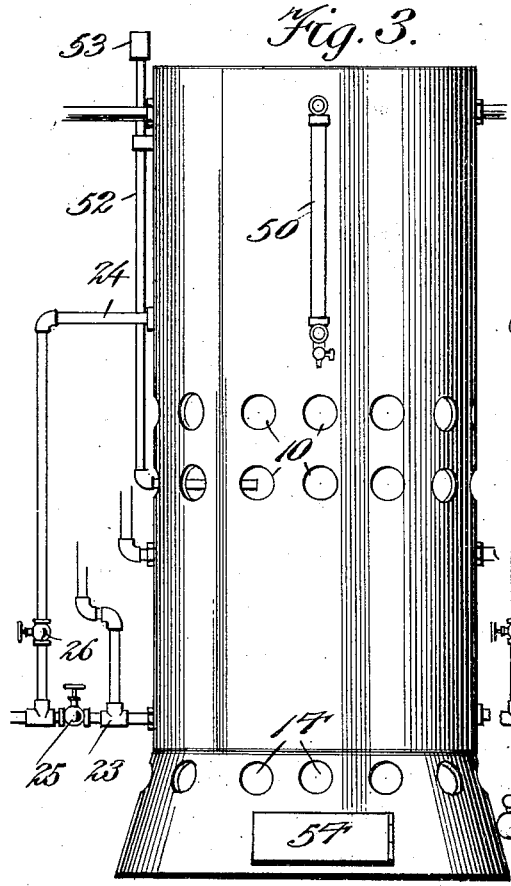
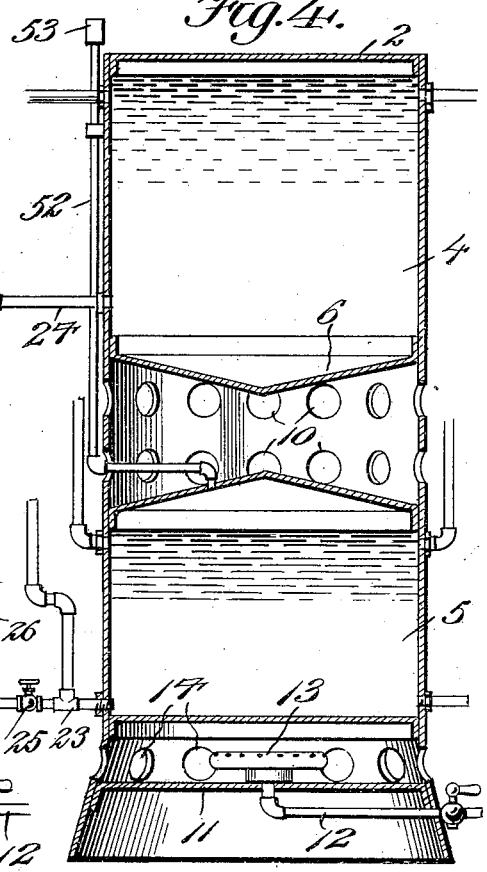
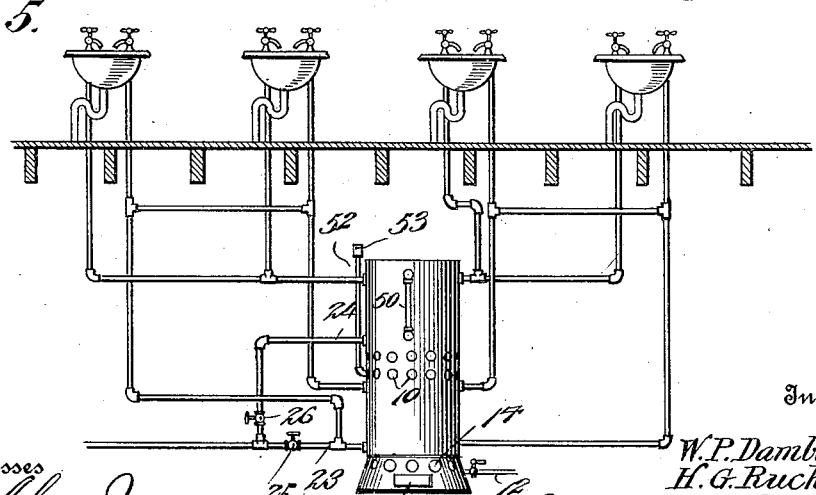
Inventor
W. P. Dambaugh
H. G. Rucker
By Victor J. Evans
Attorney

UNITED STATES PATENT OFFICE.

HARRY G. RUCKER, OF HILLSBORO, AND WILLIAM P. DAMBAUGH, OF CARLINVILLE, ILLINOIS.

WATER-HEATER.

1,070,846. Specification of Letters Patent. Patented Aug. 19, 1913.

Application filed June 15, 1912. Serial No. 703,980.

*To all whom it may concern:*

Be it known that we, HARRY G. RUCKER and WILLIAM P. DAMBAUGH, citizens of the United States, residing, respectively, at Hillsboro and Carlinville, in the counties of Montgomery and Macoupin, State of Illinois, have invented new and useful Improvements in Water-Heaters, of which the following is a specification.

The present invention relates to improvements in water heating devices primarily intended for use in tonsorial parlors where only a small amount of heated water is occasionally required but, of course, the heater may be constructed in various sizes so that the same may be employed in other places where a larger quantity of heated water is desired.

In carrying out our invention we propose to construct a device wherein either cold or hot water may be delivered to a desired locality, the said device being portable or stationary, and wherein the cold water is sustained above the heated water and constantly delivered to a receptacle for the heated water not only to supply the said receptacle but at the same time serving as an injector or compressor to permit of the heated water being ejected from the said receptacle and delivered at a point distant from the receptacle. We also aim to provide a device of this class wherein a quantity of water may be heated with a minimum amount of fuel.

A still further object of the invention is the provision of a cylinder divided into compartments, one arranged above the other, the upper compartment being adapted for the reception of cold water which is constantly delivered therefrom, to the lower compartment, the said lower compartment having a heating apparatus arranged below its bottom, and the heated water compartment having circulating pipes connected with its delivery pipe, so that the heated water will constantly circulate through the compartment and through the said pipe, a suitable faucet being provided for the delivery pipe, as well as a drainage pipe for the compartment, the upper cold water compartment being also provided with a faucet controlled delivery pipe, a drain pipe, as well as a water inlet.

With the above recited objects in view and others which will appear as the nature of the improvement is more fully developed, the invention resides in the novel construction, combination and operative arrangement of parts set forth in the following description and falling within the scope of the appended claim.

In the drawings, Figure 1 is an elevation of one form of a device constructed in accordance with the present invention. Fig. 2 is a central vertical longitudinal sectional view of the same. Fig. 3 is a view of an apparatus wherein a plurality of delivery pipes are employed. Fig. 4 is a vertical longitudinal sectional view of the same. Fig. 5 is a diagrammatic view of the system employed in connection with Figs. 3 and 4.

Referring now to the drawings in detail, the numeral 1 designates a suitable casing which, in the showing of the drawings is in the form of a cylinder, and which may be constructed of any desired metal. The receptacle 1 is preferably provided with an open top which is normally closed through the medium of a cover 2, the said cover having a suitable cylinder 3 whereby the same may be readily removed when desired. The receptacle 1 embodies an upper compartment 4 and a lower compartment 5, the upper compartment being adapted to receive cold water, while the lower compartment is adapted to receive water from the upper compartment which is to be heated in a manner which will presently be set forth. The upper compartment is of a greater area than the lower compartment and the bottom wall of the upper compartment which is designated by the numeral 6, preferably flares downwardly from its connection with the receptacle 1 to the center of the said bottom, and connected with the said center is a pipe 7, the latter passing through the upper wall 8 provided for the lower or hot water compartment to the interior of the said compartment, the pipe terminating a suitable distance away from the lower or bottom wall 9 of the said compartment 5. It will be noted by reference to the figures of the drawings, that a considerable space is maintained between the top 8 of the compartment 5 and the bottom 6 of the compartment 4, and the receptacle is provided with a plurality of openings 10 whereby air may circulate between the two compartments. It will be noted also that the bottom 9 of the compartment 5 is arranged at a suitable distance above the lower and open end of the receptacle 1, and positioned below the said compartment 5 is a brace member 11, the latter adapted to support a fuel pipe 12, which has its upper extremity provided with a burner 13. The receptacle 1, below the burner is also provided with a plurality of openings 14, the latter serving as an entrance for air to the burner 13 to provide for the ready consumption of the combustible parts of the fuel furnished to the said burner. Furthermore, the openings 14 may serve as means whereby a light may be applied to the burner. It is, of course, to be understood that the fuel pipe 12 is provided with a suitable regulating cock or valve, so that the amount of fuel fed to the burner may be readily regulated.

The pipe section 7, may if desired, be provided with a suitable cock 15, and the top 8 of the compartment 5 is preferably dome-shaped, the central portion of which being provided with a pipe 16 which has its extremity formed with a bend and with a return pipe 17, the latter entering the lower portion of the compartment as clearly illustrated in Figs. 1 and 2 of the drawings. The pipe 16 is further provided with an outlet pipe 18, the latter running to a suitable basin or the like and being provided with a faucet 19. The compartment 5 is further provided with an outlet or drain cock 20, which is employed when the water within the said compartment is to find an outlet therefrom. The numeral 21 designates a cold water supply pipe, the same also running to a basin or the like and the same being provided with the regulating faucet 22.

In Figs. 3 and 4 the device is substantially similar to that heretofore described, except that the compartments 4 and 5 have no pipe communication with each other, the water being delivered to the said compartments by pipes 23 and 24 which are connected with the main pipes of an ordinary city supply system, the said pipes 23 and 24 being provided with suitable cocks 25 and 26.

In Fig. 4 there has been illustrated the method of running the pipes from the heater to a plurality of basins.

The numeral 50 designates a water gage which communicates with the upper water compartment 4, and whereby the level of the water within the said compartment may be readily ascertained.

In practice we have found it preferable to provide the pipe sections 7 with a suitable check valve 51, which is adapted to permit of the water freely flowing from the compartment 4 to the compartment 5 but which at the same time will prevent steam or hot water from the compartment 5 entering the compartment 4. Again, we have found it preferable to provide the compartment 5 with an air inlet pipe 52, the same having its upper extremity provided with a blow-off cock 53, thus providing for the safety of the apparatus. The base of the receptacle directly below the burner 3, is provided with an opening which is normally closed through the medium of a hinged door 54, the said door providing means whereby access may be obtained to the said hollow base to permit of the removal of the burner for cleaning, etc., or for applying a flame to the burner.

From the above description, taken in connection with the accompanying drawings, the simplicity of the device as well as the advantages thereof will, it is thought, be perfectly apparent to those skilled in the art to which such inventions appertain without further detailed description.

Having thus described the invention, what we claim is:—

The herein described construction of water heaters comprising a casing having a funnel-shaped base provided with openings, a brace member within the base and adapted to support a burner, a bottom wall for the casing arranged above the burner, a cone-shaped top disposed approximately centrally of the casing, an inverted cone-shaped floor arranged above the first cone-shaped member, the casing being provided with openings disposed between the said cone-shaped members, the said cone-shaped members dividing the casing into upper and lower receptacles, a valve pipe connected with the apex of the cone-shaped lower floor of the upper compartment and entering the lower compartment and terminating adjacent the bottom or floor thereof, a circulating pipe connected with the apex of the top of the lower compartment and with the bottom of said compartment, an outlet pipe for the upper compartment, a removable closure for the upper compartment, a water gage for the upper compartment, a steam outlet pipe for the lower compartment, and a blow-off cock connected with the steam pipe.

In testimony whereof we affix our signatures in presence of two witnesses.

HARRY G. RUCKER.
WILLIAM P. DAMBAUGH.

Witnesses:
O. H. LOCHS,
JACOB HOELIN.

Copies of this patent may be obtained for five cents each, by addressing the "Commissioner of Patents, Washington, D. C."